United States Patent [19]

Sabbioni

[11] Patent Number: 4,943,218
[45] Date of Patent: Jul. 24, 1990

[54] GRANULATION CHAMBER FOR EXTRUDERS OF MATERIALS SUCH AS PLASTICS

[75] Inventor: Giuseppina Sabbioni, Santa Maria Maddalena, Italy

[73] Assignee: A. S. T. Automatismi Speciali Termoplastici S. r. l., Occhiobello, Italy

[21] Appl. No.: 241,726

[22] Filed: Sep. 8, 1988

[30] Foreign Application Priority Data

Sep. 23, 1987 [IT] Italy .................. 3616 A/87

[51] Int. Cl.$^5$ .............................................. B29B 9/16
[52] U.S. Cl. .......................................... 425/10; 264/14; 264/180; 425/68
[58] Field of Search .............. 425/67, 68, 69, 70, 425/313, 8, 7, 10; 264/142, 8, 7, 14, 180, 181; 210/415, 413

[56] References Cited

U.S. PATENT DOCUMENTS

| | | | |
|---|---|---|---|
| 2,311,606 | 2/1943 | Bannister | 210/415 |
| 2,422,480 | 0/6194 | Gordon | 264/142 |
| 3,353,681 | 11/1967 | Silva | 210/413 |
| 3,363,759 | 1/1968 | Clarke et al. | 210/415 |
| 3,586,172 | 6/1971 | Young | 210/415 |
| 4,188,286 | 2/1980 | Holz | 209/273 |
| 4,249,879 | 2/1981 | Anders et al. | 425/311 |
| 4,285,652 | 8/1981 | Anders | 425/311 |
| 4,300,877 | 11/1981 | Andersen | 425/67 |
| 4,385,884 | 5/1983 | Pecci | 425/313 |
| 4,663,099 | 5/1987 | Marven | 264/142 |

Primary Examiner—Jay H. Woo
Assistant Examiner—K. P. Nguyen
Attorney, Agent, or Firm—Guido Modiano; Albert Josif

[57] ABSTRACT

Reduced-size granulation chamber for extruders of materials such as plastics, constituted by a rotating drum wherein the cooling water remains adherent to the walls due to the centrifugal force and which has openings for the exit of the water and of the granules and is inserted in a basket which is in turn inserted in a container, both being fixed and separating the water from the granules, the granules being thrust by inclined fins arranged outside the drum in the chamber defined between the drum and the basket while the water falls by gravity into the second chamber defined between the basket and the fixed chamber.

13 Claims, 1 Drawing Sheet

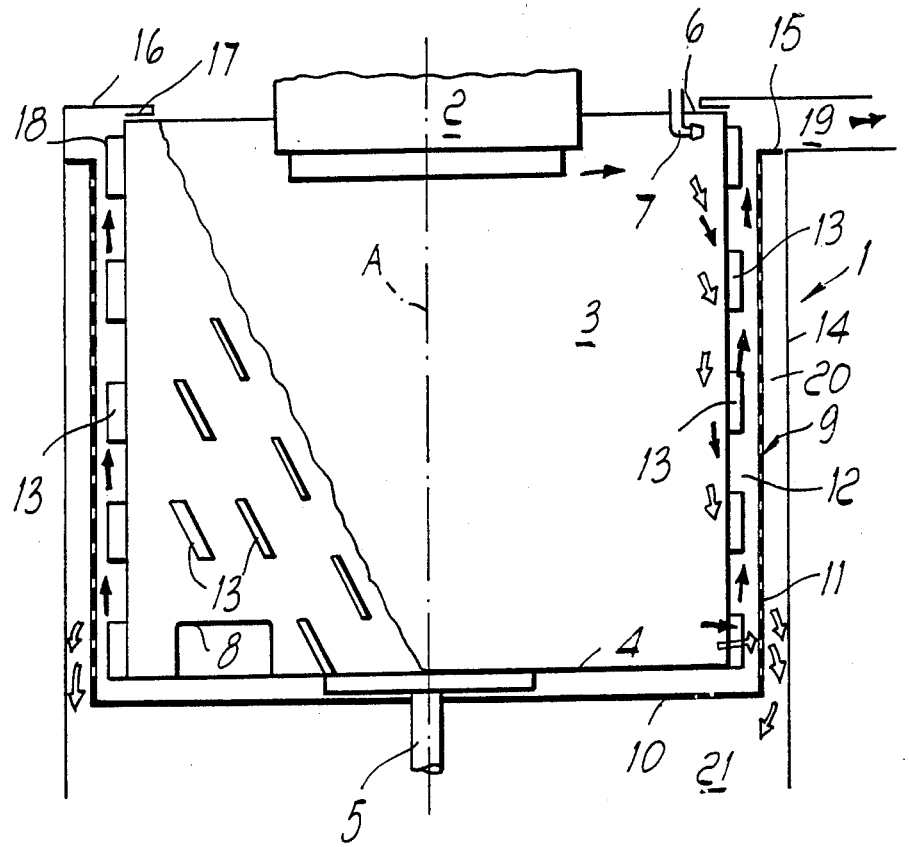

GRANULATION CHAMBER FOR EXTRUDERS OF MATERIALS SUCH AS PLASTICS

BACKGROUND OF THE INVENTION

The present invention relates to a granulation chamber for extruders of materials such as plastics, in particular for thermoplastic materials.

It is known to form granules of materials such as plastics, by means of extrusion heads from which the material exits in the form of large or small-diameter paste-like strands, rotating blades cut the strands into sorts of more or less thick pellets, or granules, and project them outwards by centrifugal force.

The granules thus formed must be cooled, and this is usually done by means of water flowing on the walls of chambers known as granulation chambers, and while the granules are paste-like they must not touch each other to avoid mutual adhesion, producing paired granules.

Currently known granulation chambers have conspicuous dimensions, require large amounts of cooling water and have troubles in supplying and scattering the water properly and in separating the cooled granules from the cooling water (drying) at the end of the process.

SUMMARY OF THE INVENTION

The aim of the present invention is to eliminate the above described disadvantages, that is to say to provide a reduced-size granulation chamber for extruders of materials such as plastics which requires a reduced amount of cooling water, wherein the water is optimally scattered, thus preventing the granules from adhering to each other and providing perfectly dry granules in output.

This aim is achieved by a granulation chamber for extruders of materials such as plastics, characterized in that it comprises a drum rotatably mounted coaxially and below the head of a vertical-axis extruder and upwardly fed by at least one injection nozzle for water to be scattered by centrifugal force on the inner face of the drum, said drum being downwardly provided with at least one opening for the exit of the water and of the granules and is supported in a perforated fixed basket, said perforated basket being mounted inside a fixed cylindrical container, said drum having, on its outer face, a plurality of inclined fins adapted to lift, granules in an annular chamber upon the rotation of the drum, said annular chamber being defined between said drum and said basket and being connected to an overlying duct for the removal of the dry granules, the water being ejected outwards by centrifugal force, passing through said basket and subsequently falling into a second chamber, defined between said basket and the fixed container, and into an underlying water collection tray.

BRIEF DESCRIPTION OF THE DRAWINGS

Further characteristics and advantages of the invention will become apparent from the detailed description of a preferred but not exclusive embodiment of a granulation chamber according to the invention, illustrated only by way of non-limitative example in the accompanying drawing, wherein:

the only FIGURE is a schematic partially cutout lateral view of a reduced-size granulation chamber according to the invention.

DESCRIPTION OF THE PREFERRED EMBODIMENTS

With reference to the above described FIGURE, the reference numeral 1 generally indicates a reduced-size granulation chamber for extruders 2 of materials such as plastics.

The extruder 2 is advantageously arranged on a vertical axis A and is of the type having a head which thrusts the granules outwards by centrifugal force (black arrows); it should be noted that extrusion heads usually operate with a horizontal axis.

Coaxially and below the extruder 2, a cylindrical drum 3 is mounted rotatable about the axis A and has its bottom 4 rigidly associated either with a shaft 5 continuously actuated in rotation by a motor not shown in the figure or even associated with the rotatable blade assembly of the extruder head.

The drum is upwardly provided with a border 6 and is fed by water supply means which advantageously consist of at least one water injection nozzle 7; in the embodiment shown in the figure, the water is distributed by centrifugal force on the inner wall of the drum, forming a film of water the thickness whereof depends on the speed of rotation of the drum and on the amount of water injected through the nozzle.

The water film in the drum tends, due to gravity, to move downwards (white arrows), dragging down the granules thrust against the walls of the drum by the extruder head.

On the cylindrical wall of the drum 3, proximate to the bottom 4, there is a plurality of openings 8 through which the water and the granules are expelled by centrifugal force; the discharge may also occur by gravity through a central opening.

The drum is inserted in a fixed sieve-like container which is advantageously constituted by a fixed cylindrical basket 9 which has a closed bottom 10 and a finely perforated vertical wall 11 which acts as a sieve, i.e. the water can flow out through 11 but the granules are retained in the first chamber 12 defined between the basket and the drum.

Elevating means are placed in the first chamber for raising the granules that exit from the drum into the first chamber. On the outer face of the drum 3, such elevating means advantageously consist of a plurality of rows of inclined fins or spirals 13 which are adapted to cause, upon the rotation of the drum, the upward motion of the granules. The basket 9 is mounted, in turn, inside a fixed outer container advantageously constituted by a fixed cylindrical container 14 which is upwardly provided with a ring 15 to which the top of the basket is fixed and with a second ring 16 which extends above the inlet of the drum, forming a sort of labyrinth 17: an annular duct 18 for the accumulation and conveyance of the granules, connected to removal path means advantageously constituted by a duct 19 for the removal of the dry granules, is defined between the rings 15 and 16; between the basket 9 and the container 14 there is instead a second chamber 20 for the descent of the water towards an underlying water collection tray 21, from which the water can be drawn to be fed again by means of a pump, with a continuous cycle, to the nozzles 7.

It should be noted that by increasing the speed of rotation of the drum it is possible to increase both the thickness of the water film on the inner wall of the drum and the time of contact of the granules with the cooling water according to the requirements determined by the characteristics of the material which is being granulated (longer contact time=greater cooling).

It should also be noted that at the exit from 19 the granulated material is practically dry, the drying also occurring as an effect of the evaporation of the water which remains on the still-warm granules.

Finally it should be observed that the arrangement of the extrusion head with a vertical axis and the arrangement of the granulator below the head, together with the reduced dimensions peculiar to the granulator, afford an extreme reduction of the dimensions of the entire apparatus.

It has thus been observed that the invention achieves the intended aim.

The invention thus conceived is susceptible to numerous modifications and variations, all of which are within the scope of the inventive concept.

Furthermore all the details may be replaced with other technically equivalent elements.

In practice, the materials employed, as well as the shapes and dimensions, may be any according to the requirements without thereby abandoning the scope of the protection of the following claims.

I claim:

1. A granulation chamber for a material extruder, the material extruder being of the type having a head which rotates about a vertical axis and projects a plurality of material granules outwardly therefrom due to centrifugal forces created by rotation of the head, said granulation chamber comprising a rotatable cylindrical drum, a fixed perforated basket, and a fixed outer container, said rotatable cylindrical drum being disposed inside side fixed perforated basket, a first chamber being thereby defined between said rotatable cylindrical drum and said fixed perforated basket, said fixed perforated basket being arranged inside said fixed outer container, a second chamber being thereby defined between said fixed perforated basket and said fixed outer container, said rotatable cylindrical drum being provided with a lower bottom and an upper border, said rotatable cylindrical drum being arranged with respect to the material extruder such that the plurality of material granules projecting from the material extruder strikes an inner face of said rotatable cylindrical drum substantially near said upper border of said rotatable cylindrical drum, said rotatable cylindrical drum being provided with at least one water injection nozzle, said at least one water injection nozzle supplying water to the inner face of said rotatable cylindrical drum substantially near said upper border of said rotatable cylindrical drum, at least one opening being provided downwardly from said upper border on a wall of said rotatable cylindrical drum, a plurality of inclined fins being outwardly provided on said rotatable cylindrical drum such that said plurality of inclined fins protrude into said first chamber, said plurality of fins being adapted to raise the plurality of material granules inside said first chamber, said fixed perforated basket being adapted to act as a sieve to allow exit of water to said second chamber while retaining the plurality of material granules in said first chamber, an overlying duct communicating with an upper outlet of said first chamber being finally provided for removal therefrom of said plurality of material granules, whereby cooling water and the plurality of material granules are joined at the inner face of said rotatable circular drum substantially near said upper border of said rotatable cylindrical drum, rotation of said rotatable circular drum causes retention of cooling water with the plurality of material granules on the inner face of said rotatable circular drum while gravity causes the cooling water with the plurality of material granules to descend downwardly on the inner face of said rotatable circular drum, said at least one opening allows for exiting of cooling water and the plurality of material granules from inside said rotatable cylindrical drum into said first chamber, rotation of said rotatable cylindrical drum and said plurality of fins causes elevation of said plurality of material granules inside said first chamber to said overlying duct while said fixed perforated basket allows for exiting of cooling water from said first chamber into said second chamber.

2. Chamber according to claim 1, further comprising a water collection tray, said water collection tray being arranged below an outlet of said second chamber for collection of water thereof.

3. A granulation chamber for a material extruder, a head of the material extruder rotating about a vertical axis and projecting a plurality of material granules outwardly therefrom due to centrifugal forces created by rotation thereof, said granulation chamber comprising a rotatable cylindrical drum and a fixed sieve-like container, said rotatable cylindrical drum being disposed inside said fixed sieve-like container to thereby define therebetween a first chamber, said rotatable cylindrical drum being arranged with respect to the material extruder such that the plurality of material granules projecting from the material extruder strikes an inner face of said rotatable cylindrical drum, said rotatable cylindrical drum being provided with water supply means, said water supply means supplying water to the inner face of said rotatable cylindrical drum so as to mix water with the plurality of material granules, at least one opening being provided downwardly on said rotatable cylindrical drum, elevating means being provided inside said first chamber for raising the plurality of material granules inside said first chamber, said fixed sieve-like container being adapted to act as a sieve to allow exit of water from said first chamber while retaining the plurality of material granules in said first chamber, removal path means communicating upwardly with said first chamber being provided for removal therefrom of said plurality of material granules, whereby cooling water and the plurality of material granules are joined at the inner face of said rotatable circular drum, rotation of said rotatable circular drum causes retention of cooling water with the plurality of material granules on the inner face of said rotatable circular drum while gravity causes the cooling water with the plurality of material granules to descend downwardly on the inner face of said rotatable circular drum, said at least one opening allows for exiting of cooling water and the plurality of material granules from inside said rotatable cylindrical drum into said first chamber, said elevation means cause raising of said plurality of material granules inside said first chamber to said overlying duct while said fixed sieve-like container allows for exiting of cooling water through said sieve-like container from said first chamber.

4. Chamber according to claim 3, wherein said fixed sieve-like container is constituted by a fixed perforated basket, said granulation chamber further comprising a fixed outer container, said fixed perforated basket being arranged inside said fixed outer container to thereby define therebetween a second chamber, said second chamber allowing for water runoff.

5. Chamber according to claim 4, further comprising a water collection tray being arranged below an outlet of said second chamber for collection of water thereof, means being provided for refeeding water to said water supply means.

6. Chamber according to claim 4, wherein said fixed outer container is constituted by a fixed cylindrical container, said fixed cylindrical container being upwardly provided with a first ring, said first ring acting as a connection element between a top portion of said fixed perforated basket and said fixed cylindrical container, said fixed cylindrical container further being provided with a second ring, said second ring extending at least partially above said rotatable cylindrical drum to thereby form a labyrinth type element, said second ring and said first ring defining therebetween an inlet to said removal path means, said removal path means being constituted by a duct.

7. Chamber according to claim 3, wherein said water supply means are constituted by at least one water injection nozzle, said at least one water injection nozzle being upwardly associated with said rotatable cylindrical drum and rotating therewith such that water is distributed on the inner face of said rotatable cylindrical drum at least in part due to centrifugal forces created thereby.

8. Chamber according to claim 3, wherein said at least one opening is constituted by a plurality of openings.

9. Chamber according to claim 8, wherein said plurality of openings is arranged proximate to a bottom of said rotatable cylindrical drum.

10. Chamber according to claim 8, wherein said plurality of openings is arranged centrally with respect to said rotatable cylindrical drum.

11. Chamber according to claim 3, wherein said elevating means are constituted by a plurality of rows of inclined spirals being arranged on an outer face of said rotatable cylindrical drum and protruding inside said first chamber, said plurality of rows of inclined spirals being adapted to cause raising of the plurality of material granules upon rotation of said rotatable cylindrical drum.

12. Chamber according to claim 3, wherein said rotatable cylindrical drum is associated with the head of the material extruder, said rotatable cylindrical drum thereby rotating along with the head.

13. Chamber according to claim 3, wherein said rotatable cylindrical drum is rotatably mounted on a shaft, said shaft extending below said rotatable cylindrical drum and being driven by motor drive means.

* * * * *